United States Patent
Tanaka

(10) Patent No.: US 8,238,358 B2
(45) Date of Patent: Aug. 7, 2012

(54) RING NETWORK, COMMUNICATION DEVICE, AND OPERATIONAL MANAGEMENT METHOD USED FOR THE RING NETWORK AND COMMUNICATION DEVICE

(75) Inventor: Hiroshi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 662 days.

(21) Appl. No.: 11/730,036

(22) Filed: Mar. 29, 2007

(65) Prior Publication Data

US 2007/0230487 A1    Oct. 4, 2007

(30) Foreign Application Priority Data

Mar. 31, 2006  (JP) .................................. 2006-96880

(51) Int. Cl.
*H04L 12/28* (2006.01)
*H04L 12/56* (2006.01)

(52) U.S. Cl. .......................... 370/406; 370/404; 370/405

(58) Field of Classification Search .......................... None
See application file for complete search history.

(56) References Cited

U.S. PATENT DOCUMENTS

| | | | |
|---|---|---|---|
| 6,014,378 A | 1/2000 | Christie et al. | |
| 6,205,158 B1 | 3/2001 | Martin et al. | |
| 6,272,142 B1 | 8/2001 | Christie et al. | |
| 6,795,440 B1 | 9/2004 | Christie et al. | |
| 7,307,947 B2 | 12/2007 | Okuno | |
| 2002/0181392 A1 | 12/2002 | Okuno | |
| 2003/0118041 A1 | 6/2003 | Fontana et al. | |
| 2004/0151172 A1 | 8/2004 | Notani et al. | |
| 2005/0063396 A1 | 3/2005 | Yu | |
| 2006/0109802 A1* | 5/2006 | Zelig et al. | 370/258 |
| 2007/0058572 A1* | 3/2007 | Clauberg | 370/258 |
| 2007/0206618 A1* | 9/2007 | Zelig et al. | 370/404 |

FOREIGN PATENT DOCUMENTS

| | | |
|---|---|---|
| CN | 1671122 A | 9/2005 |
| CN | 1671122 A | 9/2005 |
| EP | 1 324 543 A1 | 7/2003 |
| JP | 2002-359628 (A) | 12/2002 |
| JP | 2005-236631 (A) | 9/2005 |
| RU | 2 127 489 C1 | 12/1999 |

(Continued)

OTHER PUBLICATIONS

European Office Action dated Nov. 27, 2008.

(Continued)

*Primary Examiner* — Ayaz Sheikh
*Assistant Examiner* — Sori Aga
(74) *Attorney, Agent, or Firm* — McGinn IP Law Group, PLLC

(57) ABSTRACT

Frame-transfer functional units function as a switch for transferring a frame to a destination retrieved from an FDB. In transferring a frame to a ring selecting unit, the frame-transfer functional units transfers the frame with the frame added with a header in device. RPR functional units execute processing on an RPR frame received from the other communication device or a frame from the frame-transfer functional units with ring processing functional units based on an RPR protocol. The ring selecting unit searches a switch table based on information about the header in device added to the frame with the frame-transfer functional units and the RPR functional units to transfer the frame to a retrieved destination. The ring selecting unit can distribute a frame addressed to one port to plural ports.

22 Claims, 14 Drawing Sheets

FOREIGN PATENT DOCUMENTS

RU           2 176 435 C2     11/2001
WO    WO 2005/015851 A1 *   2/2005

OTHER PUBLICATIONS

Russian Office Action dated Apr. 27, 2009 with English-language Translation.
Russian Office Action dated Nov. 10, 2009 with English-language translation.
Japanese Office Action dated May 31, 2011 (with a partial English translation).
Japanese Office Action dated Oct. 18, 2011 (with a partial English translation).
European Search Report dated Jul. 26, 2007, with English translation.
Herzog M, et al. "Ringostar: An evolutionary Performance-Enhancing WDM Upgrade of IEEE 802.17 Resilient Packet Ring", IEEE Communications Magazine, IEEE Service Center, New York, NY, US, vol. 44, No. 2, Feb. 2006, pp. S11-S17, XP001240358.

* cited by examiner

FDB

| MAC ADDRESS | IDENTIFIER | PORT NUMBER |
|---|---|---|
|  |  |  |
|  |  |  |
|  |  |  |

SW TABLE

| INPUT PORT NUMBER | DESTINATION IDENTIFIER | OUTPUT PORT NUMBER |
|---|---|---|
| PORT 31 OF RING SELECTING UNIT | 2 | PORT 32 OF RING SELECTING UNIT |
| PORT 31 OF RING SELECTING UNIT | 3 | PORT 33 OF RING SELECTING UNIT |
| PORT 31 OF RING SELECTING UNIT | 4 | PORT 34 OF RING SELECTING UNIT |
| PORT 32 OF RING SELECTING UNIT | 1 | PORT 31 OF RING SELECTING UNIT |
| PORT 32 OF RING SELECTING UNIT | 3 | PORT 33 OF RING SELECTING UNIT |
| PORT 32 OF RING SELECTING UNIT | 4 | PORT 34 OF RING SELECTING UNIT |
| PORT 33 OF RING SELECTING UNIT | 1 | PORT 31 OF RING SELECTING UNIT |
| PORT 33 OF RING SELECTING UNIT | 2 | PORT 32 OF RING SELECTING UNIT |
| PORT 34 OF RING SELECTING UNIT | 1 | PORT 31 OF RING SELECTING UNIT |
| PORT 34 OF RING SELECTING UNIT | 2 | PORT 32 OF RING SELECTING UNIT |

FIG. 7

GROUP TABLE

| INPUT PORT NUMBER | ALGORITHM | GROUP PORT NUMBER |
|---|---|---|
| PORT 31 OF RING SELECTING UNIT | ROUND-ROBIN | PORT 33,34 OF RING SELECTING UNIT |
| PORT 32 OF RING SELECTING UNIT | ROUND-ROBIN | PORT 33,34 OF RING SELECTING UNIT |

FDB 413

| MAC ADDRESS | IDENTIFIER | PORT NUMBER |
|---|---|---|
| A | 1 | PORT 4111 |
|  |  |  |
|  |  |  |

FIG. 10B

FDB 433

| MAC ADDRESS | IDENTIFIER | PORT NUMBER |
|---|---|---|
| A | 1 | PORT 4111 |
|  |  |  |
|  |  |  |

FIG. 10C

FDB 413

| MAC ADDRESS | IDENTIFIER | PORT NUMBER |
|---|---|---|
| A | 1 | PORT 4111 |
| B | 3 | PORT 4311 |
|  |  |  |

FIG. 10D

FDB 433

| MAC ADDRESS | IDENTIFIER | PORT NUMBER |
|---|---|---|
| A | 1 | PORT 4111 |
| B | 3 | PORT 4311 |
|  |  |  |

FIG. 10E

FDB 443

| MAC ADDRESS | IDENTIFIER | PORT NUMBER |
|---|---|---|
| A | 1 | PORT 4111 |
|  |  |  |
|  |  |  |

FIG. 10F

FDB 443

| MAC ADDRESS | IDENTIFIER | PORT NUMBER |
|---|---|---|
| A | 1 | PORT 4111 |
| B | 4 | PORT 4411 |
|  |  |  |

SW TABLE IN THE CASE WHERE A FAILURE OCCURS

| INPUT PORT NUMBER | DESTINATION IDENTIFIER | OUTPUT PORT NUMBER |
|---|---|---|
| PORT 31 OF RING SELECTING UNIT | 2 | PORT 32 OF RING SELECTING UNIT |
| PORT 31 OF RING SELECTING UNIT | 3 | PORT 34 OF RING SELECTING UNIT (CHANGE THE PORT 33 TO PORT 34) |
| PORT 31 OF RING SELECTING UNIT | 4 | PORT 34 OF RING SELECTING UNIT |
| PORT 32 OF RING SELECTING UNIT | 1 | PORT 31 OF RING SELECTING UNIT |
| PORT 32 OF RING SELECTING UNIT | 3 | PORT 34 OF RING SELECTING UNIT (CHANGE THE PORT 33 TO PORT 34) |
| PORT 32 OF RING SELECTING UNIT | 4 | PORT 34 OF RING SELECTING UNIT |
| PORT 33 OF RING SELECTING UNIT | 1 | PORT 31 OF RING SELECTING UNIT |
| PORT 33 OF RING SELECTING UNIT | 2 | PORT 32 OF RING SELECTING UNIT |
| PORT 34 OF RING SELECTING UNIT | 1 | PORT 31 OF RING SELECTING UNIT |
| PORT 34 OF RING SELECTING UNIT | 2 | PORT 32 OF RING SELECTING UNIT |

FIG. 13A

GROUP TABLE IN THE CASE WHERE A FAILURE OCCURS

| INPUT PORT NUMBER | ALGORITHM | GROUP PORT NUMBER |
|---|---|---|
| PORT 31 OF RING SELECTING UNIT | ROUND-ROBIN | PORT 34 OF RING SELECTING UNIT (DELETE THE PORT 33) |
| PORT 32 OF RING SELECTING UNIT | ROUND-ROBIN | PORT 34 OF RING SELECTING UNIT (DELETE THE PORT 33) |

FIG. 13B

RING NETWORK, COMMUNICATION DEVICE, AND OPERATIONAL MANAGEMENT METHOD USED FOR THE RING NETWORK AND COMMUNICATION DEVICE

This application claims priority to prior Japanese application JP 2006-096880, the disclosure of which is incorporated herein by reference.

BACKGROUND OF THE INVENTION

The present invention relates to a ring network, a communication device, and an operational management method used for the ring network and communication device. In particular, the invention relates to a communication device having an RPR (Resilient Packet Ring) function.

Regarding the above RPR function, a network protocol called "RPR" marked by effective utilization of a transmission capacity, a high-speed hot standby mechanism, a double ring network, or the like has been used. This network protocol is reported in, for example, "Resilient Packet Ring" (IEEE802.17, September 2004).

A feature of the RPR protocol conforming to the IEEE802.17 standards resides in effective utilization of a transmission capacity, a high-speed hot standby mechanism, a double ring network, or the like. In the RPR, a so-called called Spatial Reuse Protocol Fairness algorithm has been adopted to realize effective use of a transmission capacity of the RPR ring network.

However, if the transmission capacity of the RPR ring network is increased beyond an upper limit of a physical transmission capacity, in an actual device, it is necessary to replace the original device or card with an RPR device that can use a transmission medium having a larger physical transmission capacity or a card having an RPR function. This causes a problem that a capacity cannot be expanded with an existing device or card.

Further, the RPR protocol defines a system for switching a transmission route in the event of a failure, such as "Wrapping" and "Steering" for a link or node failure. These systems are effective if a failure occurs at one location. However, there arises a problem in that communications between all nodes on a ring cannot be secured if failures occur at plural locations.

As a technique for solving problems of how to expand a transmission capacity and realize a redundant link, there is "Link Aggregation" based on the IEEE802.3ad. This technique is only applicable to a link connecting between two devices. Therefore, there is no way to expand a transmission capacity of an RPR ring or attain redundancy for a network of such a topology that the RPR ring or other such rings include plural nodes. Further, such system is not defined by the IEEE802.17 RPR protocol itself.

SUMMARY OF THE INVENTION

The present invention has been accomplished with a view to solving the above problems. Accordingly, it is an object of the present invention to provide a ring network, a communication device, and an operational management method used for the ring network and communication device, which can expand a transmission capacity and attain a high-reliability ring network.

According to first aspect of this invention, A ring network is configured by connecting communication devices having an RPR (Resilient Packet Ring) function with a plurality of RPR rings.

In accordance with a specific feature of the first aspect of the invention, each the communication devices includes a distributing unit for distributing traffic to the plurality of RPR rings and a consolidating unit for consolidating traffic to normal RPR rings other than an RPR ring where a link failure occurs, upon detecting the occurrence of the link failure in the RPR ring.

In accordance with another specific feature of the first aspect of the invention, each of the communication devices includes a frame-transfer functional unit serving as a switching unit for transferring a frame to a destination retrieved from a database, an RPR functional unit including a ring processing functional unit for executing processing on the frame based on an RPR protocol and the frame-transfer functional unit, and a ring selecting unit for establishing communications between the RPR functional unit and the frame-transfer functional unit. The frame-transfer functional unit transfers the frame to the ring selecting unit with the frame added with a header in device. The ring selecting unit has a port selecting function for transferring a frame to a destination retrieved from a switch table based on information about the header in device added to the frame and a grouping function that can distribute a frame addressed to a predetermined port to a plurality of ports.

According to second aspect of this invention, a communication device has an RPR (Resilient Packet Ring) function and is connected with the other communication devices via a plurality of RPR rings to configure a ring network. The communication device comprises a distributing unit for distributing traffic to the plurality of RPR rings and a consolidating unit for consolidating traffic to normal RPR rings other than an RPR ring where a link failure occurs, upon detecting the occurrence of the link failure in the RPR ring.

In accordance with a specific feature of the second aspect of the invention, the communication device comprises a frame-transfer functional unit serving as a switching unit for transferring a frame to a destination retrieved from a database, an RPR functional unit including a ring processing functional unit for executing processing on the frame based on an RPR protocol and the frame-transfer functional unit, and a ring selecting unit for establishing communications between the RPR functional unit and the frame-transfer functional unit. The frame-transfer functional unit transfers the frame to the ring selecting unit with the frame added with a header in device. The ring selecting unit has a port selecting function for transferring a frame to a destination retrieved from a switch table based on information about the header in device added to the frame and a grouping function that can distribute a frame addressed to a predetermined port to a plurality of ports.

According to third aspect of this invention, an operational management method configures a ring network configured by connecting communication devices having an RPR (Resilient Packet Ring) function with a plurality of RPR rings.

In accordance with a specific feature of the third aspect of the invention, the operational management method comprises step of distributing traffic to the plurality of RPR rings with each the communication devices and step of consolidating traffic to normal RPR rings other than an RPR ring where a link failure occurs, upon detecting the occurrence of the link failure in the RPR ring with each the communication devices.

In accordance with another specific feature of the third aspect of the invention, the communication device executes frame-transfer processing as switching processing for transferring a frame to a destination retrieved from a database, RPR processing including ring processing for executing processing on the frame based on an RPR protocol and the frame-transfer processing, and ring-selecting processing for establishing communications between a unit for the RPR processing and a unit for the frame-transfer processing. The frame-transfer processing transfers the frame to a unit for the ring-selecting processing with the frame added with a header in device. The ring-selecting processing includes port-selecting processing for transferring a frame to a destination retrieved from a switch table based on information about the header in device added to the frame and grouping processing that can distribute a frame addressed to a predetermined port to a plurality of ports.

That is, to attain the above object, the communication device according to the present invention configures a ring network by connecting between communication devices having an RPR (Resilient Packet Ring) function with plural RPR rings. Hence, the communication device of the present invention can expand a transmission capacity by use of the plural RPR rings, and if a failure occurs in any of the plural RPR rings, the remaining RPR rings make up for the failure. Accordingly, a high-reliability ring network is realized.

The thus-configured communication device according to the present invention includes a unit for distributing traffic, and a unit for detecting an RPR ring involving a ring failure, removing the RPR ring, and consolidating the traffic to a normal RPR ring. Therefore, similar to the above, it is possible to expand a transmission capacity and a high-reliability ring network.

The communication device according to the present invention is a device that can accommodate an interface port for connecting between the plural RPR rings and an external device through a transmission medium. Since a functional unit capable of logically unifying the plural RPR rings into one RPR ring is provided, a wider transmission band and a highly fault-resilient RPR ring can be attained. Further, in the communication device of the present invention, a ring capacity can be expanded only by setting a fixed table at the start of operations to thereby facilitate operational management and setup of the device.

To be specific, the communication device according to the present invention is composed of a ring selecting unit, two RPR functional units, and two frame-transfer functional units. The RPR functional units and the frame-transfer functional units are connected to the ring selecting unit. The frame-transfer functional unit functions as a switch for transferring a frame to a destination retrieved from an FDB (Forwarding Data base). In the case of transferring a frame to the ring selecting unit, a header in device is added to the frame by a header editing unit to transfer the frame.

The RPR functional unit includes a ring processing functional unit and a frame-transfer functional part. The ring processing functional unit executes processings conforming to the IEEE802.17 RPR protocol on an RPR frame received from another communication device or a frame from the frame-transfer functional unit.

The ring selecting unit is a main functional unit of the above communication device of the present invention. The ring selecting unit has a switching function that allows communication between the RPR functional unit and the frame-transfer functional unit. The ring selecting unit searches an SW (switch) table based on information about the header in device added to a frame with the frame-transfer functional unit and the RPR functional unit, and transfers the frame to the retrieved destination. The SW table is a table for detecting an output port number based on an input port number of the ring selecting unit and the information about the header in device. This table is set at the start of operations of the device.

Further, the ring selecting unit has a grouping function that enables distribution of a frame addressed to a given port to plural ports. The grouping function is a function of registering plural port numbers to be grouped in a group table of the ring selecting unit and designating desired port selecting conditions (algorithms) to thereby distribute a frame addressed to any one of the registered ports to the other registered ports in accordance with the port selecting conditions.

The ring selecting unit can transfer traffic to all registered ports with the above functions. Thus, the plural ports can be handled almost like one port. The ring selecting unit multiplies a transferable traffic volume by the number of ports registered in the group table. In this case, the group table may be set at the start of operations of the device.

The above grouping function realizes a wider transmission band for the RPR ring. Ports connected to the RPR functional unit are registered in the group table, by which a frame addressed to a given RPR functional unit is distributed to the other RPR functional units. As a result, the frame is distributed to the plural RPR rings and thus, the plural RPR rings can be handled almost like one RPR ring with an expanded transmission capacity. Further, in order to add an RPR ring and expand a transmission capacity, it is only necessary to add an RPR functional unit to the device and additionally register a port connected to the added RPR functional unit in a group table.

As described above, in the communication device according to the present invention, the frame is distributed to the plural RPR functional units with the grouping function of the ring selecting unit, so plural RPR rings operate as if combined into one RPR ring. Then, the transmission capacity of the RPR ring is multiplied by the number of combined RPR rings.

Further, in the communication device according to the present invention, in such operational form that the plural RPR rings are combined, if a link failure occurs in a given RPR ring, which cannot be overcome by an RPR protection technique (Steering and Wrapping), and communications between all nodes connected to the ring are disallowed, it is possible to continue the communications by stopping frame transfer to the failure ring and collectively transferring the frame to remaining normal rings. This function realizes a redundant RPR ring to improve a failure resistance of the RPR ring.

This function is realized by changing an output port of an entry addressed to an RPR functional unit connected to the failure ring to a port of an RPR functional unit connected to normal rings in the SW table of the ring selecting unit, and deleting the output port number from the group table. The failure is overcome only by changing the SW group and the group table, so high-speed processing is attained. Further, these tables can be automatically changed by detecting an RPR functional unit belonging to a ring where a failure occurs.

To realize the above operational form where plural RPR rings are combined, an operator has only to set a switching function of the ring selecting unit and which RPR rings are grouped in the SW table and the group table at the start of operations. Therefore, device operational management and setup are facilitated. In addition, in the case of increasing the number of RPR rings to be grouped, it is only necessary to change a switch capacity of the ring selecting unit. It is unnecessary to change the other RPR functional unit and frame-transfer functional unit, a greater flexibility is imparted to the RPR functional unit and the frame-transfer functional unit.

BRIEF DESCRIPTION OF THE DRAWINGS

FIG. 7 shows the structure of an SW table of FIG. 5;

FIG. 8 shows the structure of a group table of FIG. 5;

FIG. 10A shows data stored in an FDB according to the embodiment of the present invention;

FIG. 10B shows data stored in the FDB according to the embodiment of the present invention;

FIG. 10C shows data stored in the FDB according to the embodiment of the present invention;

FIG. 10D shows data stored in the FDB according to the embodiment of the present invention;

FIG. 10E shows data stored in the FDB according to the embodiment of the present invention;

FIG. 10F shows data stored in the FDB according to the embodiment of the present invention;

FIG. 13A shows the structure of the SW table in the case where a failure occurs in the ring network according to the embodiment of the present invention;

FIG. 13B shows the structure of the group table in the case where a failure occurs in the ring network according to the embodiment of the present invention;

DESCRIPTION OF THE PREFERRED EMBODIMENTS

Figure 1:
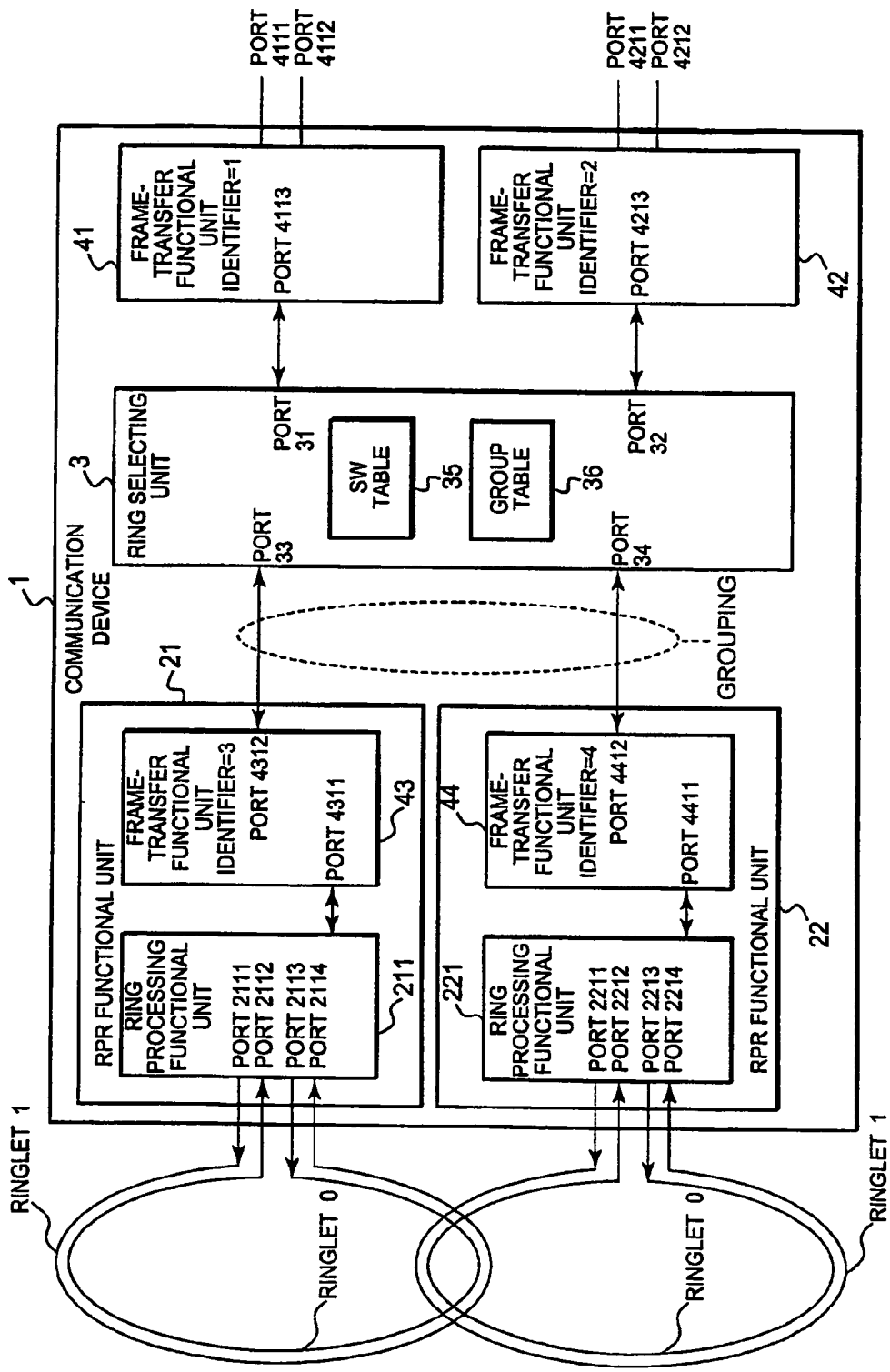
FIG. 1 is a unit diagram of a communication device according to an embodiment of the present invention.

Hereinafter, embodiments of the present invention will be described with reference to the accompanying drawings. FIG. 1 is a unit diagram of the configuration of a communication device according to an embodiment of the present invention. In FIG. 1, a communication device 1 includes a ring selecting unit 3, two RPR (Resilient Packet Ring) functional units 21 and 22, and two frame-transfer functional units 41 and 42. In the following description, the communication device of this embodiment transmits/receives Ethernet (registered network) frames, for instance, and the Ethernet (registered network) frame is simply referred to as a frame.

The RPR functional units 21 and 22 include ring processing functional units 211 and 221, and frame-transfer functional units 43 and 44. The RPR functional units 21 and 22, and the frame-transfer functional units 41 and 42 are connected to the ring selecting unit 3. The frame-transfer functional units 41 to 43 are previously given unique identifiers 1 to 4, respectively, and distinguished from one another.

The frame-transfer functional units 41 and 42 each include two ports (ports 4111 and 4112, and ports 4211 and 4212) connected to an external unit through a transmission medium to thereby transmit/receive a frame to/from the external unit. Further, the frame-transfer functional units 41 and 42 include ports 4113 and 4213 for establishing connections with the ring selecting unit 3.

The RPR functional units 21 and 22 subject the ring processing functional nits 211 and 221 and the frame-transfer functional units 43 and 44 to processing based on the IEEE (Institute of Electrical and Electronic Engineers) 802.17 standards. The ports of the frame-transfer functional units 41 and 42 are connected to the external unit. In the RPR functional units 21 and 22, the ports of the frame-transfer functional units 43 and 44 function as ports 4311 and 4411 connected to the ring processing functional units 211 and 221. Further, the frame-transfer functional units 43 and 44 include ports 4312 and 4412 for establishing connections with the ring selecting unit 3.

The ring processing functional units 211 and 221 each include West ports and East ports on Ringlet0 and Ringlet1, i.e., four physical ports 2111 to 2114 and 2211 to 2214 in total, and transmit/receive an RPR frame to/from another communication device.

The frame-transfer functional units 41 and 42 have a switching function for transferring a frame to a predetermined destination. If receiving a frame, the frame-transfer functional units 41 and 42 determine where to transfer in accordance with a destination, and transfer the received frame to the other port thereof, to a port of another frame-transfer functional unit through the ring selecting unit 3, or to the RPR functional units 21 and 22 through the ring selecting unit 3.

Figures 2, 3:
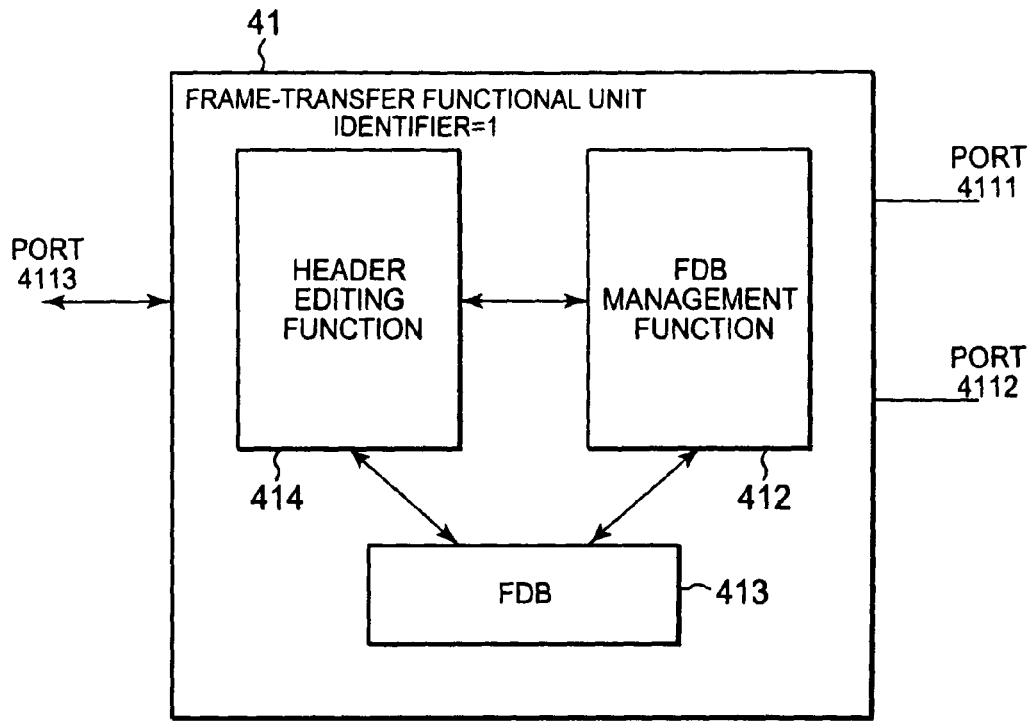
FIG. 2 is a unit diagram of the configuration of a frame-transfer functional unit of FIG. 1.
FIG. 3 shows the organization of an FDB of FIG. 2.

FIG. 2 is a unit diagram of the configuration of the frame-transfer functional unit 41. In FIG. 2, the frame-transfer functional unit 41 has an FDB (Forwarding DataBase) 413, an FDB management function 412, and a header editing function 414.

The FDB 413 is created and managed with the FDB management function 412 of the frame-transfer functional unit 41 and referenced to determine which port of the frame-transfer functional unit 41 is used to transfer a frame. Although not shown, the other frame-transfer functional units 42 to 44 have the same configuration as the frame-transfer functional unit 41.

FIG. 3 shows the organization of the FDB 413. In FIG. 3, examples of information stored in the FDB 413 include a MAC (Media Access Control) address of a frame and a port number and identifier of the frame-transfer functional unit 41. Here, a physical port number (as for the RPR functional units 21 and 22, a number of a port connected to the ring processing functional units 211 and 221) is stored in a port number field.

No data is registered in the FDB 413 unless communications are made. When the frame-transfer functional unit 41 receives a frame from its own port connected to an external unit, the unit 41 references the FDB 413 to check whether or not a MAC address of a sender is registered. If the sender's MAC address is not registered, the FDB management function 412 is executed. If a MAC address of a sender of a received frame is not registered in the FDB 413, the FDB management function 412 registers the MAC address and an input port number and identifier of the frame-transfer functional unit 41 that receives the frame, in the FDB 413.

If receiving a unicast frame, the frame-transfer functional unit 41 checks whether or not a MAC address of a destination is registered in the FDB 413. If the destination MAC address is registered, the frame-transfer functional unit 41 compares an identifier in the identifier field of the FDB 413 with its own identifier. If the two identifiers do not match with each other, the frame-transfer functional unit 41 regards the frame as a frame destined for the other frame-transfer functional unit 42. At this time, the header editing function 41 is executed.

In the case where a target frame is output from a port connected to the ring selecting unit 3, the header editing function 414 references information in the FDB 413 to create a header in device and add the header to the top of the frame. If a frame is received from the ring selecting unit 3, the frame-transfer functional unit 41 deletes a header in device of the frame, and passes the header information to the FDB management function 412 to register the information in the FDB 413.

Figure 4:
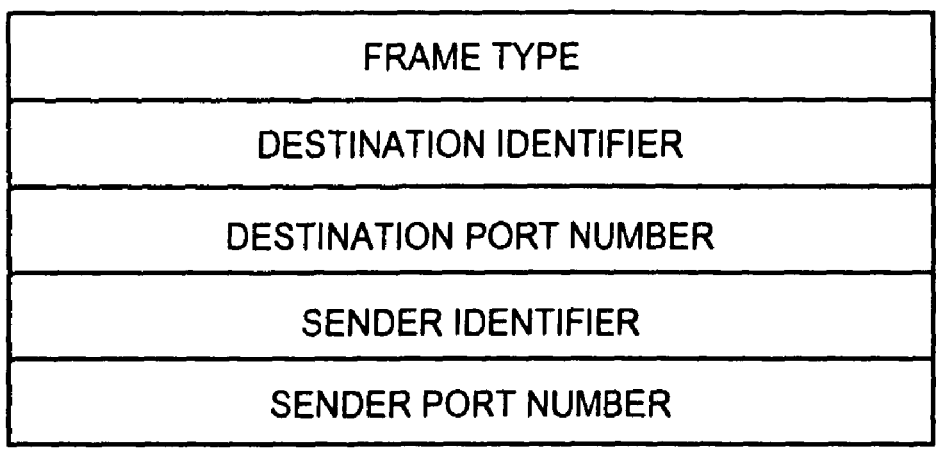
FIG. 4 shows the structure of a header in device which is added by use of a header editing function of FIG. 2.

FIG. 4 shows the structure of a header in device that is added by the header editing function 414 of FIG. 2. In FIG. 4, examples of the information in the header in device include a frame type, a destination port number, a destination identifier, a sender port number, and a sender identifier. As the frame type, "1" is stored for a unicast frame, and "2" is stored for a broadcast frame. The destination/sender port numbers denote port numbers of destination/sender frame-transfer functional units. The destination/sender identifiers denote identifiers of destination/sender frame-transfer functional units.

The destination port number and identifier are each retrieved from the FDB 413. The sender port number and identifier are an input port number and identifier of the frame-transfer functional unit 41 itself. Incidentally, if the frame type is a broadcast frame, the destination port number/identifier are not stored. A frame added with the header in device by the header editing function 414 is transferred to the ring selecting unit 3.

If the two identifiers are matched, the frame-transfer functional unit 41 determines that the port number in the port number field of the FDB 413 corresponds to its own output port and then outputs the frame to a transmission medium. If a received frame is a broadcast frame or a destination MAC address is not registered in the FDB 413, the frame-transfer functional unit 41 outputs the frame to all ports but an input port of the frame-transfer functional unit 41.

Figure 5:
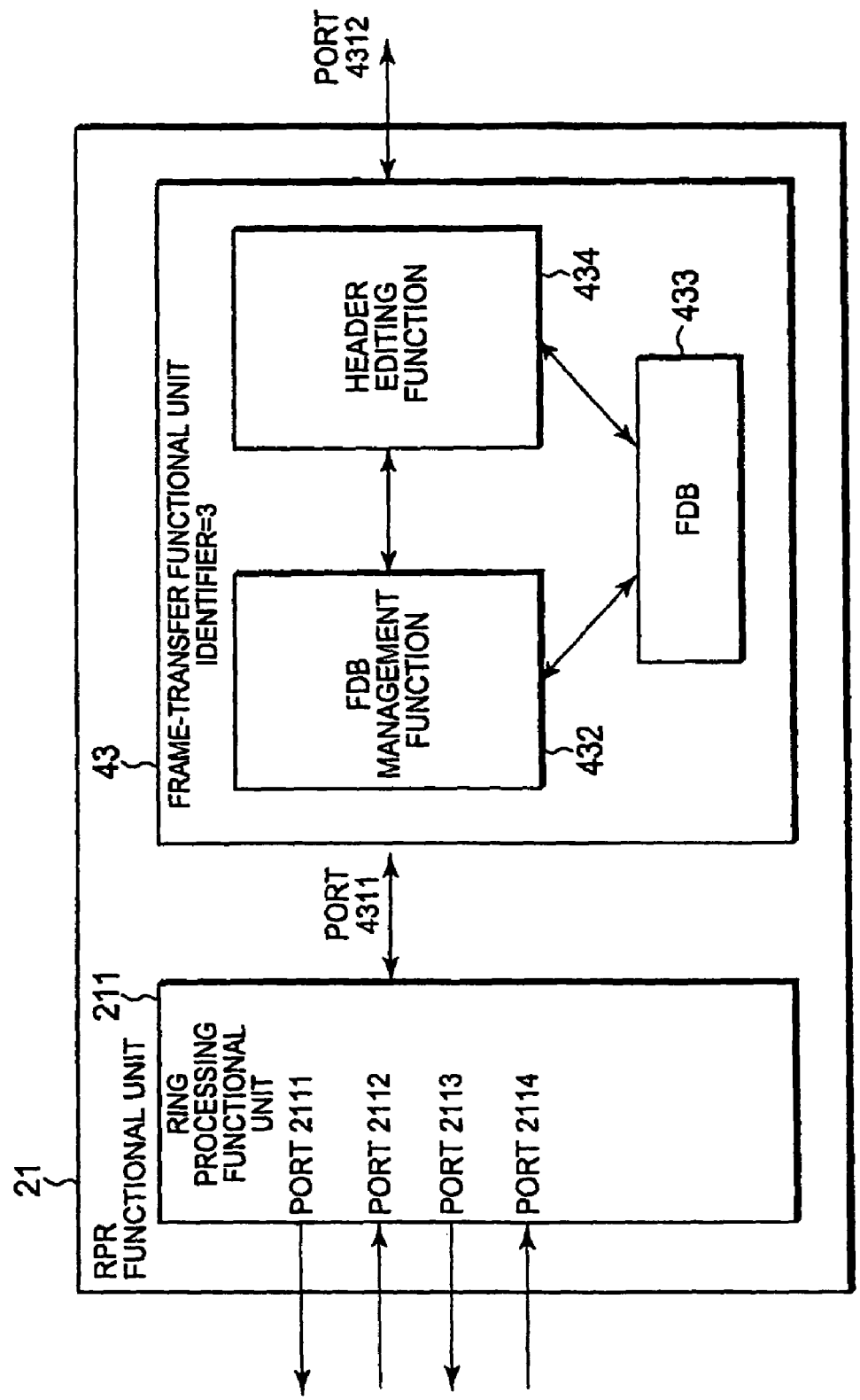
FIG. 5 is a unit diagram of the configuration of an RPR functional unit of FIG. 1.

FIG. 5 is a unit diagram of the configuration of the RPR functional unit 21 of FIG. 1. In FIG. 5, the RPR functional unit 21 includes the frame-transfer functional unit 43 and the ring processing functional unit 211 executing processing based on the IEEE802.17 standards. The configuration and operation of the frame-transfer functional unit 43 of the RPR functional unit 21 are the same as those of the above frame-transfer functional units 41 and 42. The frame-transfer functional unit 43 has an FDB 433, an FDB management function 432, and a header editing function 434, and operates upon transmitting/receiving a frame to/from the ring selecting unit 3.

If an MAC address of the device does not match with a destination MAC address stored in an RPR header of an RPR frame received from another communication device on the RPR ring, the ring processing functional unit 211 transfers a frame to a port opposite to an input port on the same Ringlet (Transit). If a MAC address of the device matches with a destination MAC address, the ring processing functional unit 211 deletes an RPR header. Further, the frame-transfer functional unit 43 selects a frame-transfer functional unit (41 or 42) to which a frame is transferred, and transfers the frame to the ring selecting unit 3 (Drop).

Further, if a frame is transferred from the frame-transfer functional unit 41 or 42 through the ring selecting unit 3, the ring processing functional unit 211 carries out encapsulation with an RPR header based on the IEEE802.17 protocol to send the frame to the other communication device from a port of the selected Ringlet (Add). The ring processing functional unit 211 executes operations conforming to the IEEE802.17 standards, and its detailed configuration and operation are not directly related to the present invention, so a description thereof is omitted here. Although not shown, the configuration and operation of the RPR functional unit 22 are the same as those of the RPR functional unit 21.

Figure 6:
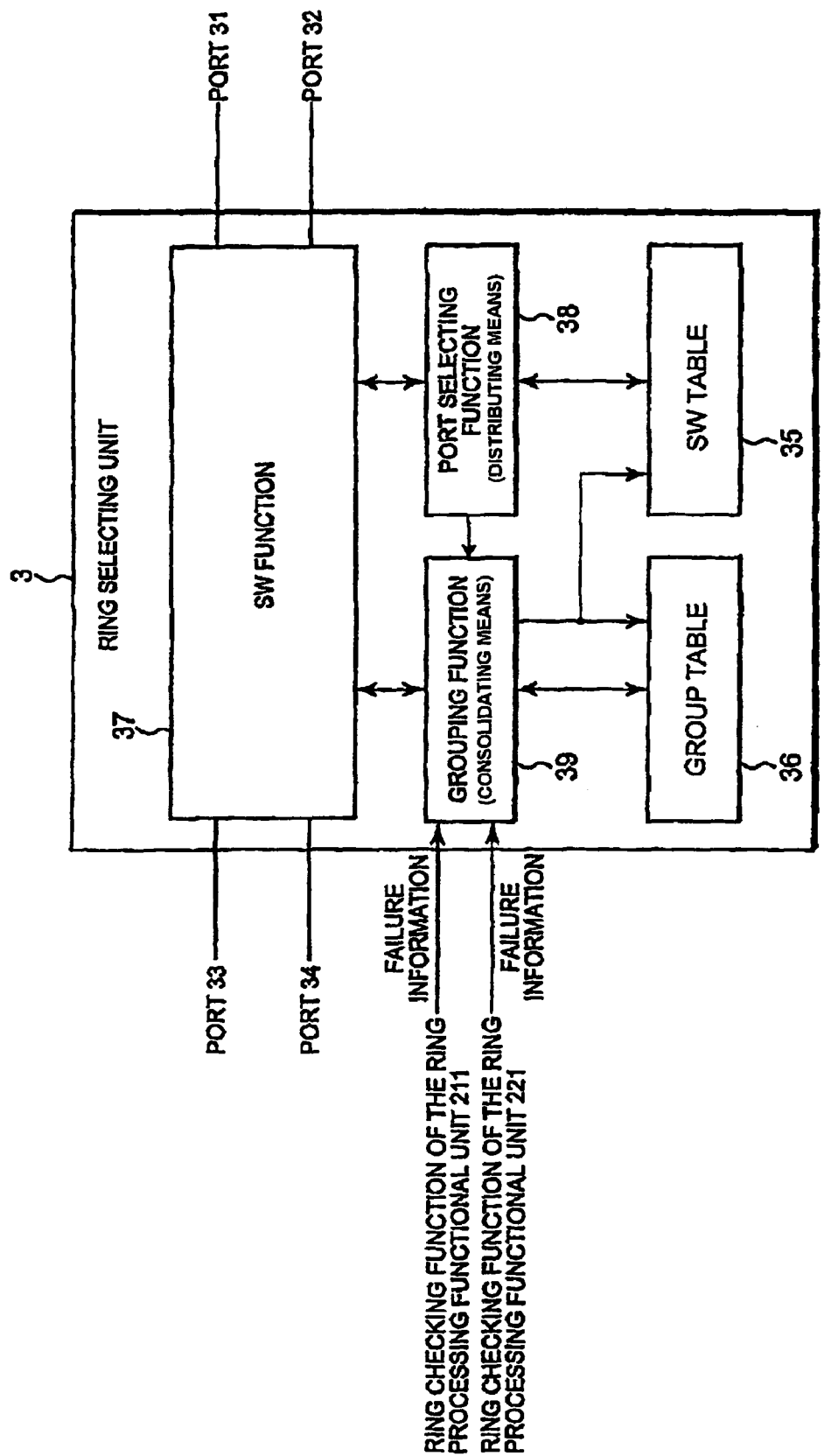
FIG. 6 is a unit diagram of the configuration of the ring selecting unit of FIG. 1.

FIG. 6 is a unit diagram of the configuration of the ring selecting unit 3 of FIG. 1. In FIG. 6, the ring selecting unit 3 includes plural ports 31 to 34, an SW table 35, and a group table 36. The ring selecting unit 3 is connected to the RPR functional units 21 and 22, and the frame-transfer functional units 41 and 42. The RPR functional units 21 and 22 and the frame-transfer functional units 41 and 42 are connected through the ring selecting unit 3 in a one-to-one correspondence. The ports 31 to 34 are given unique port numbers. The ring selecting unit 3 has a switching (SW) function 37 for establishing communications between the RPR functional units 21 and 22 and the frame-transfer functional units 41 and 42 based on information about a header in device added to a frame by the frame-transfer functional units 41 and 42 and the RPR functional units 21 and 22. Further, the ring selecting unit 3 has a port selecting function 38 and a grouping function 39.

FIG. 7 shows the structure of the SW table 35 of FIG. 6. FIG. 8 shows the structure of the group table 36 of FIG. 6. Referring now to FIG. 1 and FIGS. 5 to 8, the ring selecting unit 3 is described. As shown in FIG. 7, the ring selecting unit 3 includes the SW table 35 from which an output port number is uniquely retrievable based on an identifier and input port number of a functional unit as a transfer destination which is written to a header in device. Fixed values thereof are set in the SW table 35 beforehand.

The port selecting function 38 of the ring selecting unit 3 searches the SW table 35 based on information about a header in device of an input frame to detect an output port to instruct the SW function 37 to transfer the frame to a frame-transfer functional unit as a transfer destination.

Assuming that the RPR functional units 21 and 22 transfer a frame to the frame-transfer functional units 41 and 42, the port selecting function 38 of the ring selecting unit searches the SW table 35 based on an input port number of the ring selecting unit 3 connected with the RPR functional unit 21 or 22 as a transfer source, and an identifier of the frame-transfer functional units 41 and 42, as a transfer destination written in a header in device to thereby detect an output port number to instruct the SW function 37 to transfer the frame to the frame-transfer functional unit 41 or 42 connected to the output port.

The ring selecting unit 3 has the grouping function 39 that virtually combines plural ports into one port to realize a larger transfer capacity. The grouping function 39 can group plural ports to distribute a frame to the plural ports under arbitrary conditions. To execute the grouping function 39, as shown in FIG. 7, the ring selecting unit 3 has the group table 36 from which numbers assigned to ports belonging to a group and conditions (algorithm) for selecting an output port number from the numbers can be retrieved based on an input port number. In the group table 36, fixed values thereof are set beforehand. The output port selecting conditions (algorithm) can be arbitrarily set, and numbers of ports to be grouped are registered in the field of the group port number.

The grouping function 39 checks whether or not an output port number for a given frame, which is detected with the port selecting function 38, matches with the group port number based on an entry in the field of input port number of the group table 36. If matched, the grouping function 39 instructs the SW function 37 to output the frame to an output port selected from the group port numbers under preset conditions. If not matched, the grouping function 39 instructs the SW function 37 to output the frame to an output port selected with the port selecting function 38. If a broadcast frame is transferred, the grouping function 39 instructs the SW function 37 to transfer the frame to all ports but the input port. Incidentally, as for ports belonging to the group, the grouping function 39 transfers a frame only to one selected from the group ports in accordance with the output port selecting conditions.

If a frame is transferred from the frame-transfer functional units 41 and 42 to the RPR functional units 21 and 22, the grouping function 39 sets ports connected to the RPR functional units 21 and 22 as one group, making it possible to transfer traffic to the RPR functional units 21 and 22. The RPR functional units 21 and 22 functions almost as one RPR functional unit, so a capacity of the RPR ring increases. Incidentally, the grouping function 39 regroups plural ports based on failure information sent at the time when a failure is detected upon checking the RPR ring with a ring checking function of the ring processing functional units 211 and 221.

The port selecting conditions in the group table 36 are set in consideration of characteristics of traffic input to the communication device 1 in such a manner that traffic is appropriately distributed to the RPR functional units 21 and 22 not to lopsidedly select a port. As a result, an expanded RPR ring capacity can be efficiently used. As the port selecting conditions, round-robin, a frame, or header information of an IP (Internet Protocol) packet, or a hashing result based on a combination of these may be used.

Figure 9:
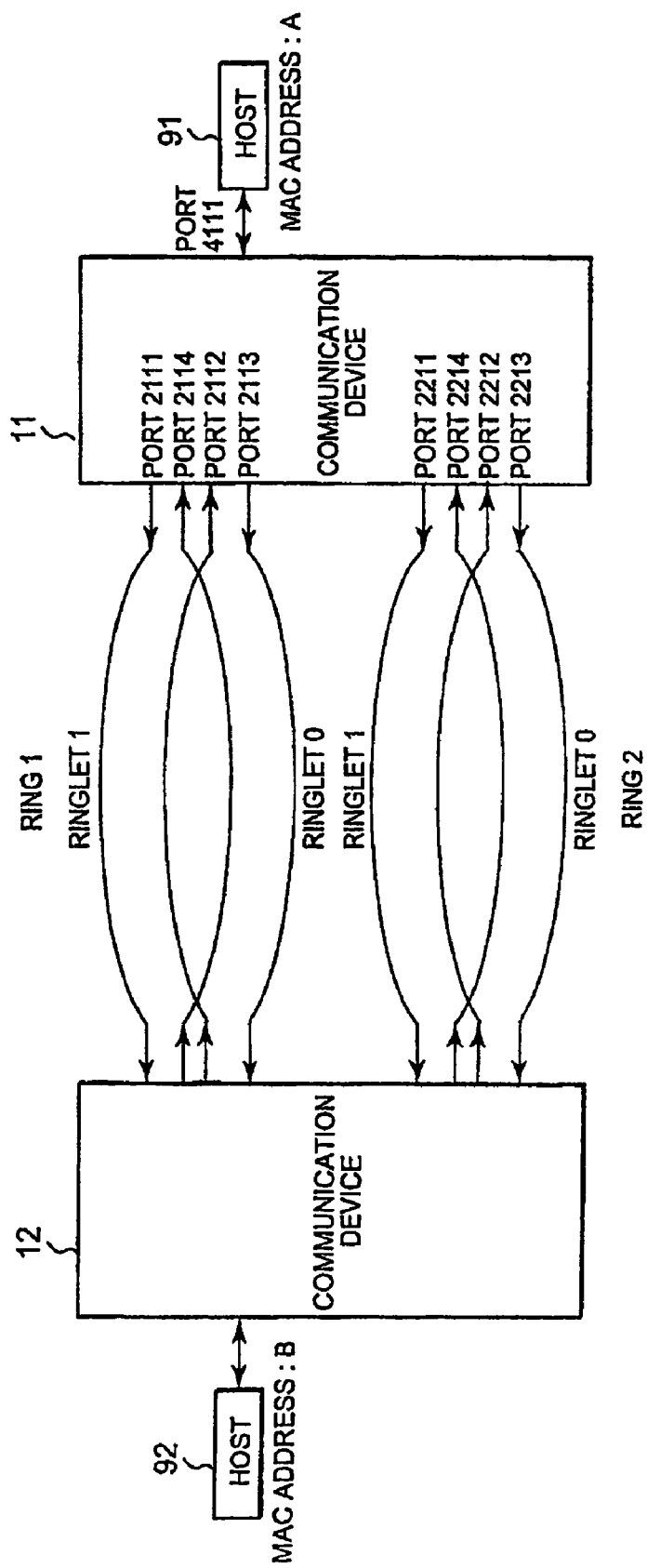
FIG. 9 is a unit diagram of the configuration of a ring network according to another embodiment of the present invention.

FIG. 9 is a unit diagram of the ring network configuration according to another embodiment of the present invention. FIGS. 10A to 10F show data stored in the FDB according to the embodiment of the present invention. Referring to FIGS. 1 to 10F, operations of the ring network of this embodiment are described next. The following description is focused on operations of the communication device 11 that communicates with hosts 91 and 92 of FIG. 9. Incidentally, since the following description is directed to the operations of the communication device 11, a description about operations of the communication device 12 is omitted. The communication device 12 operates similarly to the communication device 11.

In the ring network of this embodiment of FIG. 9, the communication devices 11 and 12 are connected to plural RPR rings, and these rings are handled as one RPR ring with the port selecting function 38 and grouping function 39 of the ring selecting unit 3 of each device. In the communication device 11, the port 4111 of the frame-transfer functional unit 41 is directly connected to the host 91. In the communication device 12 as well, the host 92 is directly connected to a port of the frame-transfer functional unit. A MAC address of the host 91 and a MAC address of the host 92 are denoted by "A" and "B", respectively.

In the communication devices 11 and 12, data as shown in FIGS. 7 and 8 are previously registered in the SW table 35 and the group table 36, respectively. The above data are registered in the SW table 35 such that an input frame from the frame-transfer functional units 41 and 42 can be output to any other frame-transfer functional units. An RPR frame subjected to DROP processing is input from the frame-transfer functional units 43 and 44. The above data are registered such that the frame can be output only to the frame-transfer functional units 41 and 42 without being sent back to the RPR ring.

In the group table 36, the ports 33 and 34 are registered as group ports. In this embodiment, the algorithm is set to round robin, and the ports are alternately selected. A ring connecting between the ports 2111 to 2114 of the communication device 11 and the communication device 12 is referred to as "ring 1" and a ring connecting between the ports 2211 to 2214 of the communication device 11 and the communication device 12 is referred to as "ring 2".

The RPR frame transfer between the communication devices 11 and 12 is as follows. That is, in the case of transferring a frame from the communication device 11 to the communication device 12 in accordance with the processing executed by the ring processing functional units 211 and 221 based on the IEEE802.17 protocol, the ports 2111 and 2211 are selected. In the case of transferring a frame from the communication device 12 to the communication device 11, the ports 2112 and 2212 are selected.

The frame transfer from the host 91 to the host 92 is described first. Since the host 91 has not yet learned an MAC address of the host 92, a frame is sent to the port 4111 of the communication device 11 with the destination MAC address set to a broadcast address and the sender MAC address set to "A".

The frame-transfer functional unit 41 references the FDB 413 to check whether or not the sender MAC address "A" of the received frame is registered. As a result, the sender MAC address "A" of the received frame has not been registered. Thus, the FDB management function 412 registers the MAC address "A", the identifier "1", and the port number "4111" are registered in the FDB 413 (see FIG. 10A).

A frame from the host 91 is a broadcast frame, so the frame is output from the ports 4112 and 4113 except the input port 4111 of the frame-transfer functional unit 41. This frame is transferred from the port 4113 to the ring selecting unit 3. Thus, the FDB 413 is referenced with the header editing function 414 to add a header in device to the top of the frame. In the header in device, the frame type "2", the sender port number "4111", and the sender identifier "1" are written. No value is stored in the field of destination port number/destination identifier because of the broadcast frame.

The port selecting function 38 of the ring selecting unit 3 references the header in device. It is determined, based on the frame type "2" that the frame is a broadcast frame. Then, the ports 32, 33, and 34 except the input port 31 are used as an output port. The grouping function 39 of the ring selecting unit 3 compares the group port number in the group table 36 for the input port 31 with the ports 32, 33, and 34. Since the ports 33 and 34 match with the number, the frame is output from the port 33 or 34 to the RPR functional units 21 and 22 in accordance with the algorithm. In this embodiment, the port 33 is selected based on the round-robin algorithm.

In addition, the port 32 does not match with the group port number in the group table 36, so the frame is directly transferred to the frame-transfer functional unit 42. Operations of the frame-transfer functional unit 42 are similar to those of the frame-transfer functional unit 41 as described later, so a description thereof is omitted here.

The frame sent from the port 33 to the frame-transfer functional unit 43 of the RPR functional unit 21 is output to the FDB management function 432 after the header in device is deleted by the header editing function 434. The sender port number "4111", the sender identifier "1", and the sender MAC address "A" written to the header in device sent to the FDB management function 432 are registered in the FDB 433 (see FIG. 10B).

It is determined, based on the frame type "2" that the frame is a broadcast frame. The frame is output to the ring processing functional unit 211 from the port 4311 except the input port 4312 of the frame-transfer functional unit 43. The ring processing functional unit 211 sends the RPR frame to the communication device 12 from the port 2111 based on the RPR protocol. The communication device 12 operates similarly to the communication device 11 as described below, so the RPR frame is sent to the host 92.

Next, a description is made of the case of transferring a frame from the host 92 to the host 91. The host 92 has learned the MAC address of the host 91. Hence, a frame is sent to the communication device 12 with the destination MAC address set to "A" and the sender MAC address "B". It is assumed that the ring 1 is selected as a result of selecting an RPR ring in the communication device 12 similar to the ring selection in the communication device 11. An RPR frame is input to the ring processing functional unit 211 of the RPR functional unit 21 from the port 2112. After subjected to DROP processing based on the RPR protocol, the frame is transferred to the port 4311.

The frame-transfer functional unit 43 references the FDB 433 of FIG. 10B to check whether or not the sender MAC address "B" of the received frame is registered. Since the sender MAC address "B" of the received frame is not registered, the FDB management function 432 registers the MAC address "B", the identifier "3", and the port number "4311" in the FDB 433 (see FIG. 10D).

The frame from the host 92 is a unicast frame, so the frame-transfer functional unit 43 checks whether or not the entry of the destination MAC address "A" is registered in the FDB 433. In this case, since the entry of the destination MAC address "A" is registered in the FDB 433, a value "1" in the identifier field is compared with the identifier "3" of the frame-transfer functional unit 43. The two identifiers do not match with each other, so the frame-transfer functional unit 43 determines that the frame is transferred from the output port 4312 to the ring selecting unit 3 to thereby execute the header editing function 434.

The header editing function 434 references the frame type "1", the sender port number "4311", the sender identifier "3", and the FDB 433 to write a destination port number "4111" and a destination identifier "1" to a header in device based on the port number. Then, the header is added to the top of the frame. The frame added with the header in device is transferred from the port 4312 to the port 33 of the ring selecting unit 3.

The port selecting function 38 of the ring selecting unit 3 references the header in device and determines, based on the frame type "1", that the frame is a unicast frame to search the SW table 35 based on the input port 33 and the destination identifier "1" in the header in device. As a result, the output port 31 is retrieved. In this case, entries in the group table 36 for the input port 33 are searched for with the grouping function 39 of the ring selecting unit 3. Since there is no entry, the output port 31 is selected. In the frame-transfer functional unit 41 that receives the frame from the port 31, the header in device is deleted with the header editing function 414 and the header information is passed to the FDB management function 412.

The frame-transfer functional unit 41 references the FDB 413 of FIG. 10A to check whether or not the sender MAC address "B" of the received frame is registered. Since the sender MAC address "B" of the received frame is not registered, the frame-transfer functional unit 41 registers the MAC address "B", the identifier "3", and the port number "4311" in the FDB 413 with the FDB management function 412 (see FIG. 10C). The frame type "1" is written to the header in device, so the frame is considered as a unicast frame. Thus, the output port number is the destination port number "4111".

The frame is sent from the port 4111 of the frame-transfer functional unit 41 to the host 91.

Next, a description is given of the case of retransferring a frame from the host 91 to the host 92. The host 91 has learned the MAC address of the host 92. Thus, a frame is sent to the port 4111 of the communication device 11 with the destination MAC address set to "B" and the sender MAC address set to "A".

The frame-transfer functional unit 41 references the FDB 413 of FIG. 10C to check whether or not the sender MAC address "A" of the received frame is registered. Since the sender MAC address "A" of the received frame is registered, subsequent processing is carried out. The frame-transfer functional unit 41 checks whether or not an entry of the destination MAC address "B" is registered in the FDB 413 because the frame is a unicast frame. In this case, the entry of the destination MAC address "B" is registered in the FDB 413, the frame-transfer functional unit 41 compares a value "3" in the identifier field with the identifier "1" of the frame-transfer functional unit 41.

Since the two identifiers do not match with each other, the frame-transfer functional unit 41 determines that the frame is transferred from the output port 4112 to the ring selecting unit 3 to execute the header editing function 414. The header editing function 414 references the frame type "1", the sender port number "4111", the sender identifier "1", and the FDB 413 to write the destination port number "4311" and the destination identifier "3" to the header in device based on the port number and add the header to the top of the frame. The frame added with the header in device is transferred to the port 31 of the ring selecting unit 3 from the port 4112.

The port selecting function 38 of the ring selecting unit 3 references the header in device to determine, based on the frame type "1", that the frame is a unicast frame, and searches the SW table 35 based on the input port 31 and the destination identifier "3" in the header in device to detect the output port 33. The grouping function 39 of the ring selecting unit 3 compares the group port numbers 33 and 34 in the group table 36 for the input port 31 with the output port 33. The port 33 is matched, so the ring selecting unit 3 outputs the frame to the RPR functional units 21 and 22 from the port 33 or 34 based on the algorithm. In this case, the port 33 is selected in the previous frame transfer, so the port 34 is selected this time based on the round-robin algorithm.

In the frame-transfer functional unit 44 of the RPR functional unit 22 that receives the frame from the port 34, the header in device is deleted with the header editing function 444, and the header information is passed to the FDB management function 442. The frame-transfer functional unit 44 references the FDB 443 to check whether or not the sender MAC address "A" of the received frame is registered. Since the sender MAC address "A" of the received frame is not registered, the frame-transfer functional unit 44 registers the MAC address "A", the identifier "1", and the port number "4111" in the FDB 443 with the FDB management function 442 (see FIG. 10E).

In this case, the frame type "1" is written to the header in device. Thus, it is determined that the frame type is a unicast frame. Here, the port number of the destination port 4311 is stored as the destination port number in the header in device. If the port 4411 of the frame-transfer functional unit 44 does not match with the port number of the destination port 4311, the frame cannot be transferred. To overcome this problem, the same port number is assigned to ports connecting between the frame-transfer functional units and the ring processing functional units of the RPR functional units, which are grouped with the grouping function. The same port number is assigned to the ports 4311 and 4411 in this way, making it possible to transfer a frame for which the port number is set to the destination port 4311, toward the ring processing functional unit 221 from the port 4411.

The ring processing functional unit 221 sends an RPR frame to the communication device 12 from the port 2211 based on the RPR protocol. The communication device 12 operates similarly to the communication device 11 to transmit a frame to the host 92.

Next, a description is given of the case of sending a frame back to the host 91 from the host 82. Since the host 92 has learned the MAC address of the host 91, the frame is transferred to the communication device 12 with the destination MAC address set to "A" and the sender MAC address set to "B". In the communication device 12, an RPR ring is selected similar to the ring selection in the communication device 11. In the previous frame transfer, the ring 1 is selected, so the ring 2 is selected this time based on the round-robin algorithm. The RPR frame is input to the ring processing functional unit 221 of the RPR functional unit 22 from the port 2212. The RPR frame is subjected to DROP processing based on the RPR protocol. The resultant RPR frame is transferred to the port 4411.

The frame-transfer functional unit 44 references the FDB 443 of FIG. 10E to check whether or not the sender MAC address "B" of the received frame is registered. Since the sender MAC address "B" of the received frame is not registered in the FDB 443, the FDB management function 442 registers the MAC address "B", the identifier "4", and the port number "4411" in the FDB 443 (see FIG. 10F).

The frame is a unicast frame, so the frame-transfer functional unit 44 checks whether or not an entry of the destination MAC address "A" is registered in the FDB 443. Since the entry of the destination MAC address "A" is registered in the FDB 443, the frame-transfer functional unit 44 compares a value "1" in the identifier field with the identifier "4" of the frame-transfer functional unit 44.

The two identifiers do not match with each other, so the frame-transfer functional unit 44 determines that a frame is transferred from the output port 4412 to the ring selecting unit 3 and thus executes the header editing function 444. The header editing function 444 references the frame type "1", the sender port number "4411", the sender identifier "4", and the FDB 443 to write the destination port number "4111" and the destination identifier "1" to a header in device based on the port number and add the header to the top of the frame. The frame added with the header in device is transferred to the port 34 of the ring selecting unit 3 from the port 4412.

The port selecting function 38 of the ring selecting unit 3 references the header in device to determine that the frame is a unicast frame based on the frame type "1", and searches the SW table 35 based on the input port 34 and the destination identifier "1" in the header in device to detect the output port 31. The grouping function 39 of the ring selecting unit 3 searches for entries of the input port 34 across the group table 36. However, there is no corresponding port, the output port 31 is used.

The header editing function 414 of the frame-transfer functional unit 41 that receives a frame from the port 31 deletes the header in device, and the header information is passed to the FDB management function 412. The frame-transfer functional unit 41 references the FDB 413 of FIG. 10C to check whether or not the sender MAC address "B" of the received frame is registered.

Here, since the entries of the sender MAC address "B", the identifier "3", and the port "4311" are registered in the FDB 413, the frame-transfer functional unit 41 does not register entries of the MAC address "B" of the received frame, the identifier "4", and the port "4411" and advances to the next processing. If a frame for which the destination MAC address is set to "B" is received from the port 4111 or 4112, the header in device including the identifier "3" is added as a result of searching the FDB 413. The frame is transferred to the ring selecting unit 3 while addressed to the frame-transfer functional unit 43, not to the frame-transfer functional unit 44 with the identifier "4". However, the ports 33 and 34 connected to the frame-transfer functional units 43 and 44 are grouped with the grouping function 39 of the ring selecting unit 3, and either port is selected, so the frame is also transferred to the frame-transfer functional unit 44 even if not addressed to the frame-transfer functional unit 44. Hence, no problem arises.

The frame-transfer functional unit 41 references the header in device to determine that the frame type is a unicast frame based on the frame type "1". Therefore, the destination port number "4111" is set as the output port number. The frame is sent from the port 4111 of the frame-transfer functional unit 41 to the host 91.

Through the above operations, the construction of the FDB for establishing communications between the hosts 91 and 92 through plural rings is completed. In subsequent communications, the unicast frame transfer is repeatedly performed.

Figure 11:
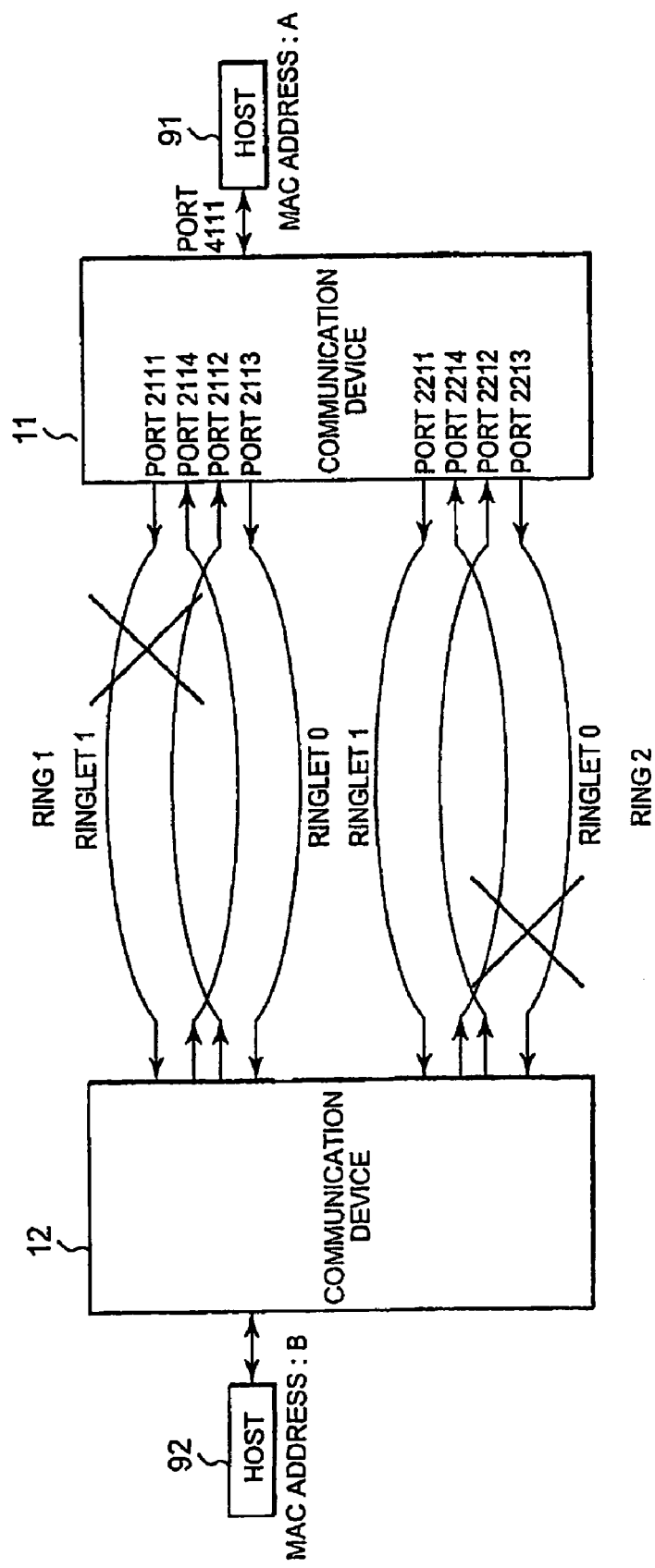
FIG. 11 shows the configuration where a failure occurs in the ring network according to the embodiment of the present invention.
Figure 12:
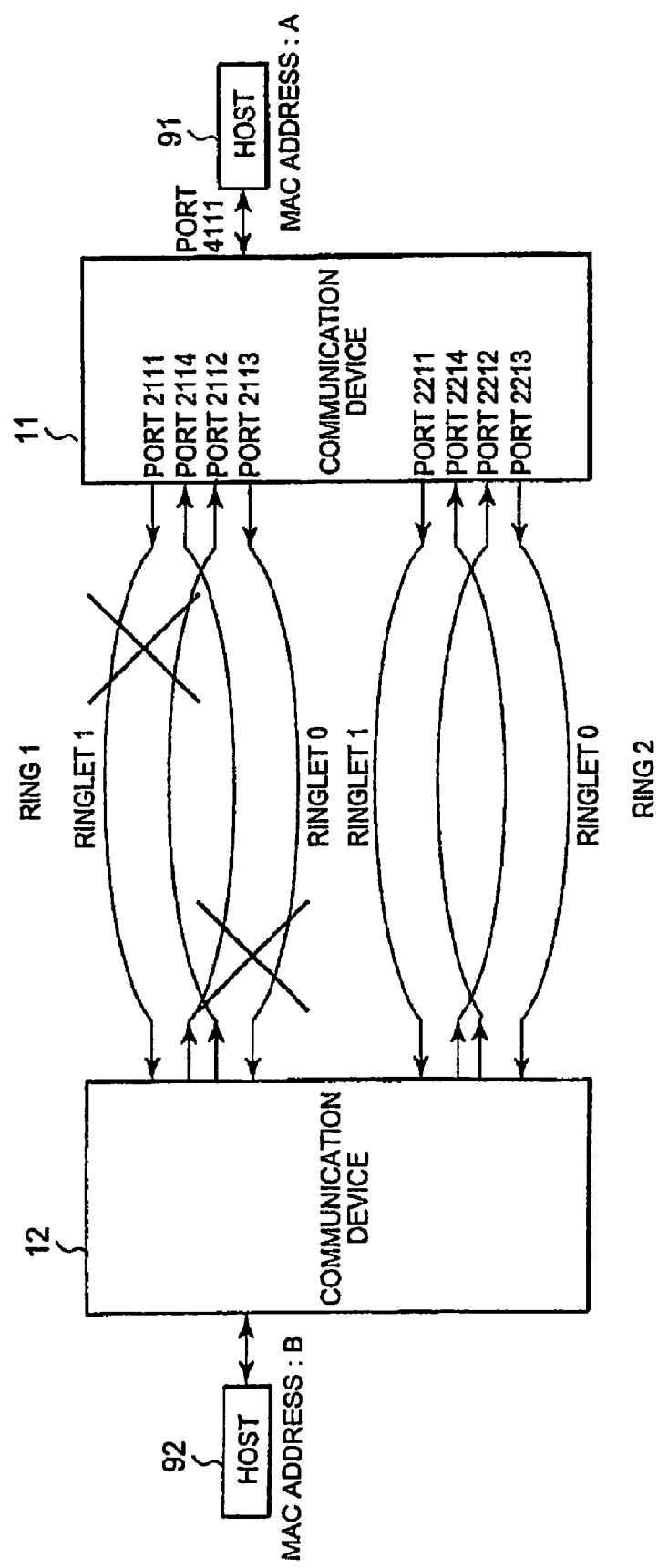
FIG. 12 shows the configuration where a failure occurs in the ring network according to the embodiment of the present invention.

FIGS. 11 and 12 show the configuration of the ring network according to the embodiment of the present invention, in which a failure occurs. FIG. 13A shows the structure of the SW table in the case where a failure occurs in the ring network according to the embodiment of the present invention. FIG. 13B shows the structure of the group table in the case where a failure occurs in the ring network according to the embodiment of the present invention. Referring to FIGS. 11, 12, 13A, and 13B, a description is given of operations in the event a failure occurs in a ring. In this embodiment, an operational management method varies depending on a ring failure type.

As shown in FIG. 11, under such conditions that a ring failure occurs only at one location per ring, if a frame is transferred to whichever RPR ring, the frame can be transferred between the communication devices 11 and 12 on the RPR ring through Wrapping or Steering that is executed with the RPR functional unit based on the RPR protocol by avoiding the failure ring. Hence, the communication devices 11 and 12 can use all the RR rings. Hence, the functional units other than the RPR functional units in the communication devices 11 and 12 do not take a particular countermeasure against a failure.

As shown in FIG. 12, if a link failure occurs at two or more locations per RPR ring, frame transfer between the communication devices 11 and 12 on the ring 1 is disallowed, and communications can be made between the communication devices 11 and 12 on the remaining rings solely (at least one ring), the communication devices 11 and 12 operate to collectively transfer a frame on the remaining RPR rings.

This makes it possible to avoid such a situation that a frame is transferred on the failure RPR ring and keep communications between the communication devices 11 and 12 to thereby improve a failure resistance.

As shown in FIG. 12, if the transfer on the ring 1 is disallowed, and a failure such as link disconnection is detected with the ring processing functional unit of the RPR functional unit based on the RPR protocol, frame transfer is centralized to the ring 2 not to transfer a frame on the ring 1. Thus, the ring selecting unit 3 overwrites the data stored in the SW table 35 and the group table 36 in response to a notification about the failure from the ring processing functional unit. That is, as a result of comparing the SW table 35 of FIG. 13A with the SW table 35 of FIG. 7, an output port number for the entry of the destination identifier "3" is changed from 33 to 34, so no frame is transferred to the RPR functional unit 21 connected to the ring 1. As a result of comparing the group table 36 of FIG. 13B with the group table 36 of FIG. 8, the port 33 is deleted from the group port number field, so no frame is transferred to the RPR functional unit 21 connected to the ring 1.

Next, a description is made of operations of the communication device 11 in the case where a failure occurs in the ring 1 as shown in FIG. 12 with the FDBs 413, 433, and 443 as shown in FIGS. 10C, 10D, and 10F through the above communications between the hosts. In the case of transferring a frame from the host 91 to the host 92, the host 91 transfers the frame to the port 4111 of the communication device 11 with the destination MAC address set to "B" and the sender MAC address set to "A".

The frame-transfer functional unit 41 references the FDB 413 of FIG. 10C to check whether or not the sender MAC address "A" is registered. Since the sender MAC address "A" is registered in the FDB 413, the next processing is executed. The frame is a unicast frame, so the frame-transfer functional unit 41 checks whether or not an entry of the destination MAC address "B" is registered in the FDB 413. Since the destination MAC address "B" is registered in the FDB 413, the frame-transfer functional unit 41 compares a value "3" in the identifier field with the identifier "1" of the frame-transfer functional unit 41. The two identifiers do not match with each other, so the frame-transfer functional unit 41 determines that the frame is transferred from the output port 4112 to the ring selecting unit 3 and executes the header editing function 414.

The header editing function 414 references the frame type "1", the sender port number "4111", the sender identifier "1", and the FDB 413 to write the destination port number "4311" and the destination identifier "3" to a header in device based on the port number to add the header to the top of the frame. The frame added with the header in device is transferred from the port 4112 to the port 31 of the ring selecting unit 3.

The port selecting function 38 of the ring selecting unit 3 references a header in device to determine, based on the frame type "1", that the frame is a unicast frame, and searches the SW table 35 based on the input port 31 and the destination identifier "3" in the header in device to detect the output port 34. The grouping function 39 of the ring selecting unit 3 compares the group port number "34" in the group table 36 for the input port 31 with the output port 34. Since the two ports match with each other, the ring selecting unit 3 outputs the frame from the port 34 to the RPR functional unit 22.

In the frame-transfer functional unit 44 of the RPR functional unit 22 that receives a frame from the port 34, a header in device is deleted with the header editing function 444. After that, the header information is sent to the FDB management function 442. The frame-transfer functional unit 44 references the FDB 443 to check whether or not the sender MAC address "A" of the received frame is registered. Since the sender MAC address "A" is registered in the FDB 443, the next processing is carried out.

The frame-transfer functional unit 44 references the header in device to determine, based on the frame type "1", that the frame is a unicast frame, and sets the destination port number "4311" to the output port number. Similar to the above processing, even if the destination port number corresponds to the port 4311, the same value is set to the ports 4311 and 4411, so the frame is transferred to the ring processing functional unit 221 from the port 4411.

The ring processing functional unit 221 sends an RPR frame to the communication device 12 from the port 2211 through the ring 2. The communication device 12 operates similarly to the communication device 11, and transmits a frame to the host 92. Subsequent frame transfer between the hosts 91 and 92 is allowed through the ring 2 in accordance with the above procedure, so its description is omitted here.

As described above, in this embodiment, the frame transfer can be centralized to the ring 2 only by overwriting entries of the two fixed tables (the SW table 35 and the group table 36) of the ring selecting unit 3.

As another conceivable method of centralizing frame transfer, there is a method of rewriting a new identifier into the FDB for a frame-transfer functional unit that is disallowed to transfer a frame (identifier "3" is changed to "4"). However, plural FDBs of the frame-transfer functional units are provided in a distributed manner, so many entries are written to the FDB in many cases. Therefore, it can be readily supposed that data in the SW table 35 and group table 36 can be changed more easily than change in identifier in a particular FDB. Therefore, the ring consolidating method that changes the SW table 35 and the group table 36 is preferred because a failure can be avoided at higher speed.

Figure 14:
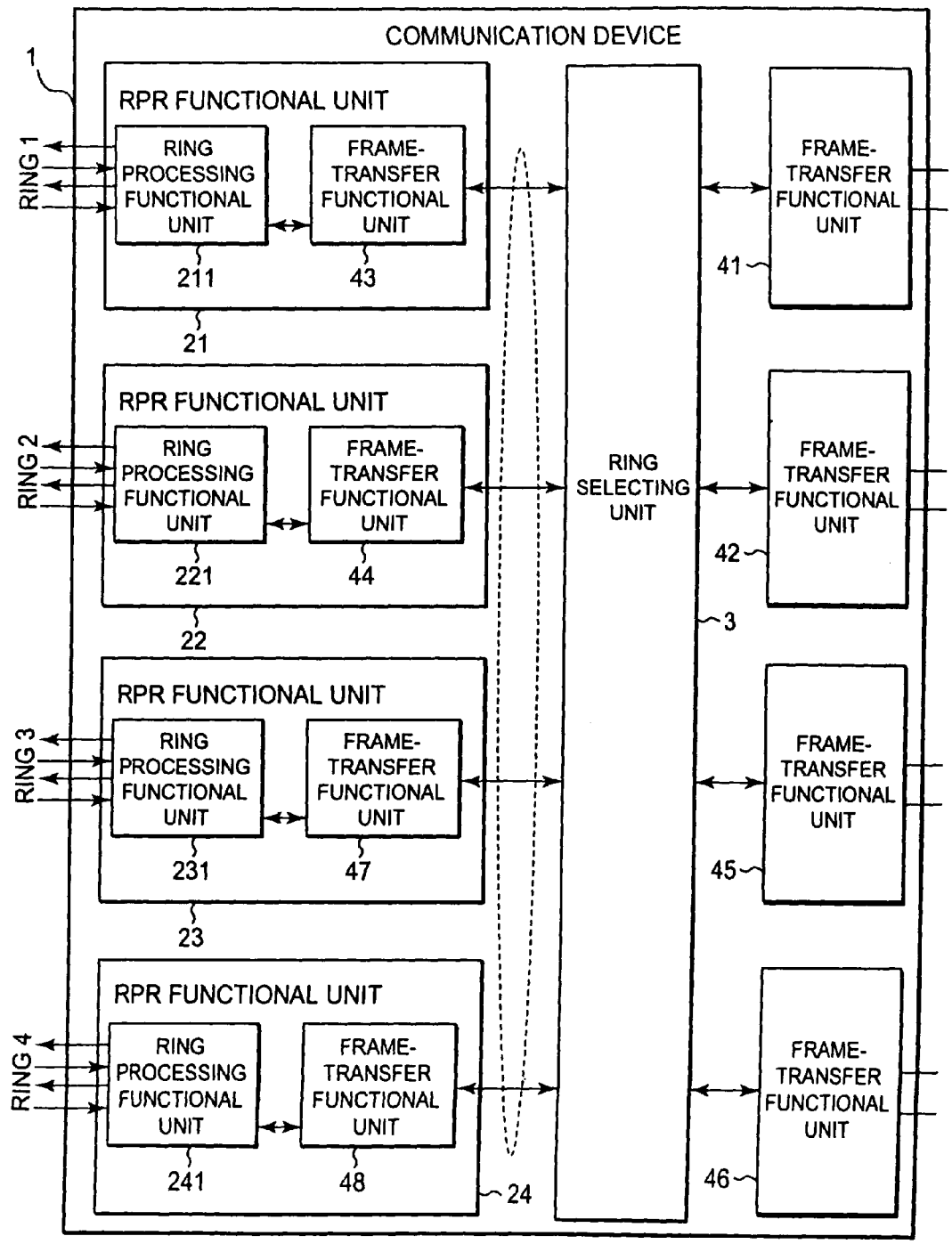
FIG. 14 is a unit diagram of a configuration of a communication device in the case of increasing a capacity of an RPR ring according to the embodiment of the present invention.

FIG. 14 is a unit diagram of the configuration of the communication device 1 in the case of increasing a capacity of an RPR ring according to the embodiment of the present invention. In the configuration of the communication device 1 as illustrated in FIG. 14, two RPR functional units 23 and 24, and two frame-transfer functional units 45 and 46 are added to add rings 3 and 4 to the RPR ring group to thereby quadruple the capacity of the RPR ring.

The RPR functional units 23 and 24 include ring processing functional units 231 and 241, and frame-transfer functional units 47 and 48. Further, the RPR functional units 23 and 24 and the frame-transfer functional units 45 and 46 are connected to the ring selecting unit 3, and the frame-transfer functional units 45 to 48 are given unique identifiers for distinguishing the units from one another beforehand.

In this case, additional entries are registered in the SW table 35 to enable frame transfer from the frame-transfer functional units 41 and 42 to the frame-transfer functional units 45, 46, 47, and 48, and from the frame-transfer functional units 45 and 46 to the remaining frame-transfer functional units such that a frame can be transferred between the above two RPR functional units 23 and 24 and the two frame-transfer functional units 45 and 46 and between existing RPR functional units and the frame-transfer functional units. This makes it possible to transfer a frame sent from any one of the frame-transfer functional units 41, 42, 45, and 46 to a ring composed of the rings 1, 2, 3, and 4.

Further, an RPR frame that undergoes DROP processing is input to the frame-transfer functional units 43, 44, 47, and 48, and the frame cannot be sent back to the RPR ring. Accordingly, additional entries are registered to enable frame transfer from the frame-transfer functional units 43 and 44 to the frame-transfer functional units 45 and 46 and from the frame-transfer functional units 47 and 48 to only the frame-transfer functional units 41, 42, 45, and 46.

Further, the port number of the ring selecting unit 3 connected to the RPR functional units 23 and 24 is added to the group port number field in the group table 36. In this way, the capacity of the RPR ring can be quadrupled by only adding settings to the two fixed groups (the SW table 35 and the group table 36). Here, the ring selecting unit 3 is assumed to have a switching function with a capacity enough to accommodate the RPR ring group.

As described above, in this embodiment, the plural RPR rings cannot be accommodated and consolidated into one RPR ring, so a transmission capacity of the RPR ring can be multiplied by the number of consolidated rings.

Further, in this embodiment, provided is a ring consolidating function for consolidating plural RPR rings into one RPR ring to thereby overcome a link failure that disables communications between all communication devices and cannot be avoided with only a protection function based on the RPR protocol. Therefore, a failure resistance of the RPR ring can be improved.

Further, in this embodiment, the ring consolidating function can be executed only by changing two fixed tables (the SW table 35 and the group table 36) set in one functional unit (ring selecting unit) in the device, so a failure can be avoided at higher speeds.

Moreover, the function of consolidating the plural RPR rings into one RPR ring is attained only by setting the two fixed tables (the SW table 35 and the group table 36) set in one functional unit (ring selecting unit) in the device to thereby facilitate device operation.

In this embodiment, the numbers of RPR rings and ports can increase or decrease only by changing the switch capacity of the ring selecting unit connected to the RPR functional unit or frame-transfer functional unit. Hence, it is unnecessary to change the RPR functional unit or frame-transfer functional unit. The device can be flexibly designed with varying numbers of RPR rings and ports.

Figure 15:
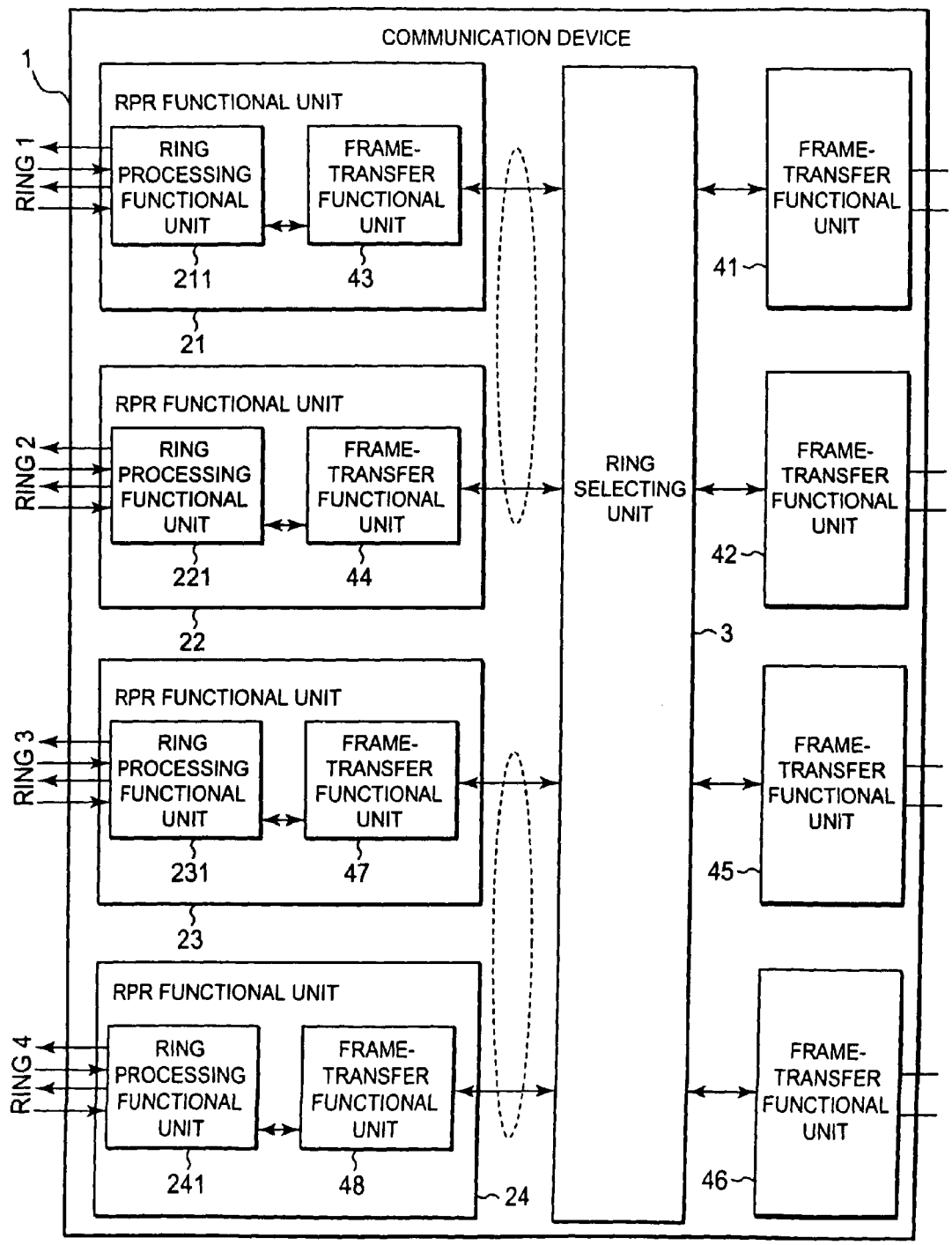
FIG. 15 is a unit diagram of another configuration of the communication device in the case of increasing the number of RPR rings according to the embodiment of the present invention.

FIG. 15 is a unit diagram of the configuration of the communication device 1 in the case of increasing the number of RPR rings according to the embodiment of the present invention. In the communication device 1 illustrated in FIG. 15, two RPR functional units 23 and 24 and two frame-transfer functional units 45 and 46 are added to obtain a new RPR ring group (group including rings 3 and 4) to thereby provide two RPR rings with a ring capacity twice as large as before. The RPR functional units 23 and 24 include ring processing functional units 231 and 241 and frame-transfer functional units 47 and 48. Further, the RPR functional units 23 and 24 and the frame-transfer functional units 45 and 46 are connected to the ring selecting unit 3. The frame-transfer functional units 45 to 48 are given unique identifiers for distinguishing the units from one another beforehand.

In this case, additional entries are registered in the SW table 35 to enable frame transfer from the frame-transfer functional units 41 and 42 to the frame-transfer functional units 45, 46, 47, and 48, and from the frame-transfer functional units 45 and 46 to the remaining frame-transfer functional units such that a frame can be transferred between the above two RPR functional units 23 and 24 and the two frame-transfer functional units 45 and 46 and between existing RPR functional units and the frame-transfer functional units. This makes it possible to transfer a frame sent from any one of the frame-transfer functional units 41, 42, 45, and 46 to a ring composed of the rings 1 and 2 or the rings 3 and 4.

Further, an RPR frame that undergoes DROP processing is input to the frame-transfer functional units 43, 44, 47, and 48, and the frame cannot be sent back to the RPR ring. Accordingly, additional entries are registered to enable frame transfer from the frame-transfer functional units 43 and 44 to the frame-transfer functional units 45 and 46 and from the frame-transfer functional units 47 and 48 to only the frame-transfer functional units 41, 42, 45, and 46.

Further, a group table where the port number of the ring selecting unit 3 connected to the frame-transfer functional units 45 and 46 is set to the input port number, and the port number of the ring selecting unit 3 connected to the RPR functional units 23 and 24 is set to the group port number is added to the group table 36. In this way, it is possible to configure two RPR rings the capacity of which is quadrupled by only adding data to the two fixed groups (the SW table 35 and the group table 36). Here, the ring selecting unit 3 is assumed to have a switching function with a capacity enough to accommodate the RPR ring group.

Figure 16:
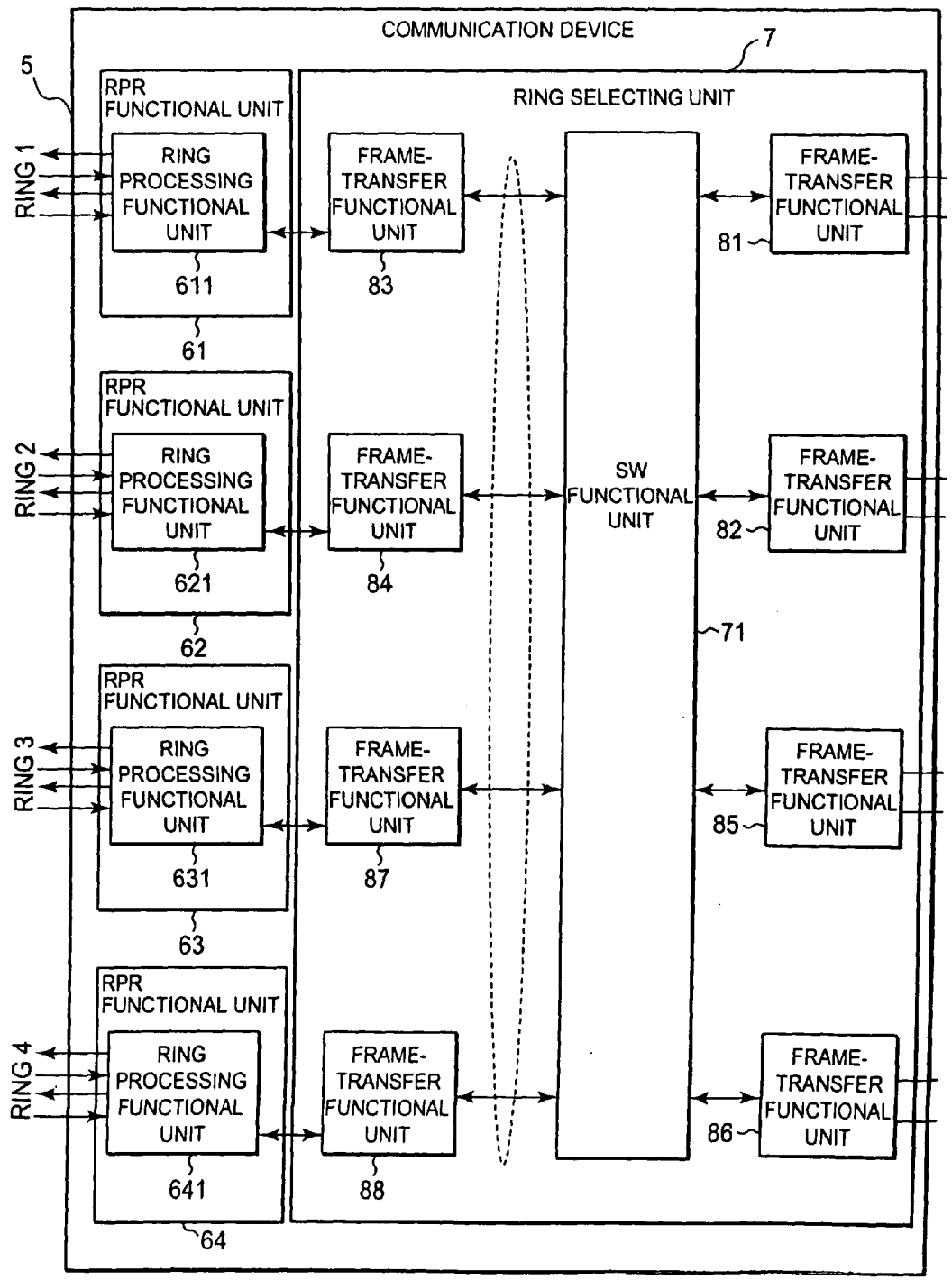
FIG. 16 is a unit diagram of the configuration of a communication device according to another embodiment of the present invention.

FIG. 16 is a unit diagram of the configuration of a communication device according to another embodiment of the present invention. In FIG. 16, a communication device 5 of this embodiment has the same configuration as that of the communication device 1 according to the above embodiment of the present invention as shown in FIG. 14 except that the frame-transfer functional units 43, 44, 47, and 48 and the frame-transfer functional units 41, 42, 45, and 46 in the RPR functional units 21 to 24 of the communication device 1 are accommodated in the ring selecting unit 3.

That is, the communication device 5 includes RPR functional units 61 to 64 having ring processing functional units 611, 621, 631, and 641 and a ring selecting unit 7 having an SW functional unit 71, and frame-transfer functional units 81 to 88. Operations and effects of the communication device 5 are the same as the communication device 1 of the above embodiment. Incidentally, in the ring selecting unit 7, the frame-transfer functional units 81, 82, 85, and 86 or frame-transfer functional units 83, 84, 87, and 88 may be consolidated into one frame-transfer functional unit.

Incidentally, in the above embodiments of the present invention, the two RPR functional units and frame-transfer functional units are provided. At least one RPR functional unit and one frame-transfer functional unit should be connected. If one RPR functional unit is provided, this unit normally operates as an RPR device of a single ring. A transmission capacity of the RPR ring can be expanded insofar as two or more RPR functional units are provided. The number of frame-transfer functional units may not correspond to the number of RPR functional units.

Similar to the above, the ring selecting unit 3 should have at least 2 ports, and the number of ports needs to correspond to the sum total of RPR functional units and frame-transfer functional units. However, a ring selecting unit having more than 2 ports may be prepared. To give an example thereof, RPR functional units or frame-transfer functional units may be mounted onto different interface cards that are removably inserted to the device. In this case, a necessary interface card can be added for a port connected to nowhere in the ring selecting unit.

As described above, according to the present invention, arbitrary numbers of RPR functional units, frame-transfer functional units, and ports of the ring selecting unit 3 may be provided as long as the numbers exceed the above lower limits.

The present invention realizes the above configuration and operations and thus attains effects of expanding a transmission capacity and improving a reliability of a ring network.

What is claimed is:

1. A ring network comprising communication devices having an RPR (Resilient Packet Ring) function and a plurality of RPR rings each of which is connected to the same communication devices as those which another of the RPR rings is connected, wherein each of the communication, devices comprises:
a frame-transfer functional unit serving as a switching unit for transferring a frame to a destination retrieved from a database;
an RPR functional unit comprising a ring processing functional unit and a different frame-transfer functional unit serving as a different switching unit for transferring a different frame to a different destination retrieved from a different database, the ring processing functional unit executing processing on the frame based on an RPR protocol; and a ring selecting unit for establishing communications between the RPR functional unit and the frame-transfer functional unit, wherein the frame-transfer functional unit transfers the frame to the ring selecting unit with the frame added with a header in a device, wherein the ring selecting unit includes a port selecting function for transferring the frame to a destination retrieved from a switch table based on information about the header in the device added to the frame, and a grouping function that distributes a frame addressed to a predetermined port to a plurality of ports, wherein one of the communication devices performs said port selecting function and said grouping function, wherein the different frame-transfer functional unit connects the ring selecting unit to the ring processing functional unit, wherein the different frame-transfer functional unit selects one of a plurality of ones of the frame-transfer functional unit to which the frame is transferred, and transfers the frame to the ring selecting unit, and wherein a port selecting processing based on said port selecting function and a grouping processing based on said grouping function are exclusively performed by the ring selecting unit of said each of the communication devices.

2. The ring network according to claim 1, wherein the ring selecting unit of each of the communication devices comprises:

a distributing unit for distributing traffic to the plurality of RPR rings; and a consolidating unit for consolidating traffic to normal RPR rings other than an RPR ring where a link failure occurs, upon detecting an occurrence of the link failure in the RPR ring.

3. The ring network according to claim 2, wherein said each of the communication devices logically consolidates the plurality of RPR rings into one RPR ring with the distributing unit and the consolidating unit.

4. The ring network according to claim, 1, wherein the switch table comprises a table which is searched to detect an output port number based on an input port number of the ring selecting unit and the information about the header in the device, and fixed data are set in the switch table at a start of operations of the device.

5. The ring network according to claim 4, wherein the grouping function registers numbers of a plurality of ports to be grouped in a group table set in the ring selecting unit, and designates a desired port selecting condition to distribute the frame addressed to one of the registered ports to other registered ports in accordance with the port selecting condition.

6. The ring network according to claim 5, wherein the RPR functional unit is added to the device, and a port connected to the added RPR functional unit is additionally registered in the group table.

7. The ring network according to claim 1, wherein a number of RPR rings can be increased only by changing a switch capacity of the ring selecting unit.

8. A communication device in a ring network which comprises the communication device, other communication devices, and a plurality of RPR (Resilient Packet Ring) rings each of which is connected to the same communication devices including the communication device as those which another of the RPR rings is connected, the communication device having an RPR function and comprising:

a frame-transfer functional unit serving as a switching unit for transferring a frame to a destination retrieved from a database;

an RPR functional unit comprising a ring processing functional unit and a different frame-transfer functional unit serving as a different switching unit for transferring a different frame to a different destination retrieved from a different database, the ring processing functional unit executing processing on the frame based on an RPR protocol; and a ring selecting unit for establishing communications between the RPR functional unit and the frame-transfer functional unit, wherein the frame-transfer functional unit transfers the frame to the ring selecting unit with the frame added with a header in a device, wherein the ring selecting unit includes a port selecting function for transferring the frame to a destination retrieved from a switch table based on information about the header in the device added to the frame, and a grouping function that distributes a frame addressed to a predetermined port to a plurality of ports, and wherein the ring selecting unit comprises:

a distributing unit for distributing traffic to the plurality of RPR rings; and a consolidating unit for consolidating traffic to normal RPR rings other than an RPR ring where a link failure occurs, upon detecting an occurrence of the link failure in the RPR ring, wherein one of said same communication devices performs said port selecting function and said grouping function, wherein the different frame-transfer functional unit connects the ring selecting unit to the ring processing functional unit, wherein the different frame-transfer functional unit selects one of a plurality of ones of the frame-transfer functional unit to which the frame is transferred, and transfers the frame to the ring selecting unit, and wherein a port selecting processing based on said port selecting function and a grouping processing based on said grouping function are exclusively performed by the ring selecting unit.

9. The communication device according to claim 8, wherein the communication device logically consolidates the plurality of RPR rings into one RPR ring with the distributing unit and the consolidating unit.

10. A communication device in a ring network which comprises the communication device, other communication devices, and a plurality of RPR (Resilient Packet Ring) rings each of which is connected to the same communication devices including the communication device as those which another of the RPR rings is connected, the communication device having an RPR function and comprising:

a frame-transfer functional unit serving as a switching unit for transferring a frame to a destination retrieved from a database;

an RPR functional unit comprising a ring processing functional unit and a different frame-transfer functional unit serving as a different switching unit for transferring a different frame to a different destination retrieved from a different database, the ring processing functional unit executing processing on the frame based on an RPR protocol; and a ring selecting unit for establishing communications between the RPR functional unit and the frame-transfer functional unit, wherein the frame-transfer functional unit transfers the frame to the ring selecting unit with the frame added with a header in a device, wherein the ring selecting unit has a port selecting function for transferring a frame to a destination retrieved from a switch table based on information about the header in the device added to the frame, and a grouping function that distributes a frame addressed to a predetermined port to a plurality of ports, wherein one of said same communication devices performs said port selecting function and said grouping function, wherein the different frame-transfer functional unit connects the ring selecting unit to the ring processing functional unit, wherein the different frame-transfer functional unit selects one of a plurality of ones of the frame-transfer functional unit to which the frame is transferred, and transfers the frame to the ring selecting unit, and wherein a port selecting processing based on said port selecting function and a grouping processing based on said grouping function are exclusively performed by the ring selecting unit.

11. The communication device according to claim 10, wherein the switch table comprises a table which is searched to detect an output port number based on an input port number of the ring selecting unit and the information about the header in the device, and fixed data are set in the switch table at a start of operations of the device.

12. The communication device according to claim 11, wherein the grouping function registers numbers of a plurality of ports to be grouped in a group table set in the ring selecting unit, and designates a desired port selecting condition to distribute the frame addressed to one of the registered ports to other registered ports in accordance with the port selecting condition.

13. The communication device according to claim 12, wherein the RPR functional unit is added to the device, and a port connected to the added RPR functional unit is additionally registered in the group table.

14. The communication device according to claim 10, wherein a number of RPR rings can be increased only by changing a switch capacity of the ring selecting unit.

15. An operational management method for a ring network comprising communication devices having an RPR (Resilient Packet Ring) function and a plurality of RPR rings each of which is connected to the same communication devices as those which another of the RPR rings is connected, each of the communication devices comprising:

a frame-transfer functional unit serving as a switching unit for transferring a frame to a destination retrieved from a database;

an RPR functional unit comprising a ring processing functional unit and a different frame-transfer functional unit serving as a different switching unit for transferring a different frame to a different destination retrieved from a different database, the ring processing functional unit executing processing on the frame based on an RPR protocol; and a ring selecting unit for establishing communications between the RPR functional unit and the frame-transfer functional unit, the frame-transfer functional unit transferring the frame to the ring selecting unit with the frame added with a header in a device, said method comprising:

port-selecting processing, carried out in the ring selecting unit of each of the communication devices, for transferring the frame to a destination retrieved from a switch table based on information about the header in a device added to the frame; and grouping processing, carried out in the ring selecting unit of each of the communication devices, for distributing a frame addressed to a predetermined port to a plurality of ports, wherein one of the communication devices performs said port-selecting processing and said grouping processing, wherein the different frame-transfer functional unit connects the ring selecting unit to the ring processing functional unit, wherein the different frame-transfer functional unit selects one of a plurality of ones of the frame-transfer functional unit to which the frame is transferred, and transfers the frame to the ring selecting unit, and wherein said port-selecting processing and said grouping processing are exclusively performed by the ring selecting unit.

16. The operational management method according to claim 15, further comprising:

distributing, in the ring selecting unit of said each of the communication devices, traffic to the plurality of RPR rings with said each of the communication devices; and consolidating, in the ring selecting unit of said each of the communication devices, traffic to normal RPR rings other than an RPR ring where a link failure occurs, upon detecting an occurrence of the link failure in the RPR ring with each the communication devices.

17. The operational management method according to claim 16, wherein said each of the communication devices logically consolidates the plurality of RPR rings into one RPR ring with the distributing unit and the consolidating unit.

18. The operational management method according to claim 15, wherein the switch table comprises a table which is searched to detect an output port number based on an input port number of a ring selecting unit and the information about the header in the device, and fixed data are set in the switch table at a start of operations of the device.

19. The operational management method according to claim 18, wherein the grouping processing registers numbers of a plurality of ports to be grouped in a group table set in the ring selecting unit, and designates a desired port selecting condition to distribute the frame addressed to one of the registered ports to other registered ports in accordance with, the port selecting condition.

20. The operational management method according to claim 19, wherein the link for the RPR processing is added to the device, and a port connected to the added unit is additionally registered in the group table.

21. The operational management method according to claim 15, wherein a number of RPR rings can be increased only by changing a switch capacity of the ring selecting unit for executing the ring-selecting processing.

22. The ring network according to claim 1, wherein said port selecting processing based on the port selecting function and said grouping processing based on the grouping function are centralized to the ring selecting unit of said each of the communication devices.

* * * * *